United States Patent
El-Yamany

(10) Patent No.: US 12,267,600 B2
(45) Date of Patent: Apr. 1, 2025

(54) METHOD FOR PROCESSING IMAGE DATA OF AN IMAGE SENSOR BASED ON SYMMETRIC OR ASYMMETRIC POSITIONING OF PHASE DETECTION PIXEL, IMAGE PROCESSOR UNIT AND COMPUTER PROGRAM

(71) Applicant: SHENZHEN GOODIX TECHNOLOGY CO., LTD., Shenzhen (CN)

(72) Inventor: Noha El-Yamany, Tomesch (DE)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 18/019,876

(22) PCT Filed: Dec. 8, 2021

(86) PCT No.: PCT/EP2021/084758
§ 371 (c)(1),
(2) Date: Feb. 6, 2023

(87) PCT Pub. No.: WO2023/104298
PCT Pub. Date: Jun. 15, 2023

(65) Prior Publication Data
US 2024/0015407 A1    Jan. 11, 2024

(51) Int. Cl.
*H04N 23/84* (2023.01)
*H04N 25/704* (2023.01)

(52) U.S. Cl.
CPC ........... *H04N 23/84* (2023.01); *H04N 25/704* (2023.01)

(58) Field of Classification Search
CPC ..... H04N 23/84; H04N 25/704; H04N 23/672
See application file for complete search history.

(56) References Cited

U.S. PATENT DOCUMENTS

| | | | |
|---|---|---|---|
| 8,531,563 B2 | 9/2013 | Tanaka | |
| 9,462,237 B2 * | 10/2016 | Koshiba | ............... H04N 23/843 |
| 2019/0075233 A1 * | 3/2019 | Galor Gluskin | ....... H04N 23/55 |

(Continued)

FOREIGN PATENT DOCUMENTS

| | | |
|---|---|---|
| DE | 102019128781 A1 | 4/2021 |
| WO | WO2017/052923 A1 | 3/2017 |

OTHER PUBLICATIONS

International Search Report from corresponding International Patent Application No. PCT/EP21/84758, dated Jul. 28, 2022.

(Continued)

*Primary Examiner* — Gevell V Selby
(74) *Attorney, Agent, or Firm* — Emerson, Thomson & Bennett, LLC; Roger D. Emerson; Seth J. Niemi

(57) ABSTRACT

The invention discloses a method for processing image data of an image sensor, said image sensor comprises a sensor area of a pixel matrix providing image pixel data, wherein the pixel matrix comprises phase detection pixels at pre-defined locations, and wherein a set of image pixel data comprises phase detection information of said phase detection pixels, and wherein a step of calculating image pixel data for the pre-defined locations of the phase detection pixels as a function with either symmetric or asymmetric positioning of the respective phase detection in the colour channel is performed.

17 Claims, 3 Drawing Sheets

(56) References Cited

U.S. PATENT DOCUMENTS

2019/0098240 A1* 3/2019 Kobayashi ........... H04N 23/672
2020/0296295 A1* 9/2020 Ugawa ................. H04N 23/672

OTHER PUBLICATIONS

N. El-Yamany: "Robust Defect Pixel Detection and Correction for Bayer Imaging Systems," in: IS&T International Symposium on Electronic Imaging 2017, p. 46-51.

E. Chang: "Kernel-size selection for defect pixel identification and correction", in: Proc. SPIE 6502, Digital Photography III, 65020J, Feb. 20, 2007.

A. Tanbakuchi, A. van der Sijde, B. Dillen, A. Theuwissen and W. de Haan: "Adaptive pixel defect correction", in: Proc. SPIE Sensors and Camera Systems for Scientific, Industrial and Digital Photography Applications IV, vol. 5017, pp. 360-370, 2003.

M. Schoberl, J. Seiler, B. Kasper, S. Foessel and A. Kaup: "Sparsity-based detect pixel compensation for arbitrary camera raw images", in: IEEE International Conference on Acoustics, Speech and Signal Processing, pp. 1257-1260, 2011.

* cited by examiner

| 1(B) | 2(W) | 3(B) | 4(W) | 5(G) | 6(W) | 7(G) | 8(W) |
|---|---|---|---|---|---|---|---|
| 9(W) | 10(B) | 11(W) | 12(B) | 13(W) | 14(G) | 15(W) | 16(G) |
| 17(B) | 18(W) | 19(B) | 20(W) | 21(G) | 22(W) | 23(G) | 24(W) |
| 25(W) | 26(B) | 27(W) | 28(B) | 29(W) | 30(G) | 31(W) | 32(G) |
| 33(G) | 34(W) | 35(G) | 36(W) | 37(R) | 38(W) | 39(R) | 40(W) |
| 41(W) | 42(G) | 43(W) | 44(G) | 45(W) | 46(R) | 47(W) | 48(R) |
| 49(G) | 50(W) | 51(G) | 52(W) | 53(R) | 54(W) | 55(R) | 56(W) |
| 57(W) | 58(G) | 59(W) | 60(G) | 61(W) | 62(R) | 63(W) | 64(R) |

Fig. 1

| G | R | B | G | B | G | B | R | G | G | B | R | G |
|---|---|---|---|---|---|---|---|---|---|---|---|---|
| B | G | PA(G) | R | G | PB(G) | B | G | PA(G) | R | G | PB(G) | B |
| R | G | G | B | G | G | R | G | G | B | G | G | R |
| G | B | R | G | R | B | G | B | R | G | R | B | G |
| R | G | G | B | G | G | R | G | G | B | G | G | R |
| B | PA(G) | PB(G) | R | PA(G) | PB(G) | B | PA(G) | PB(G) | R | PA(G) | PB(G) | B |
| G | R | B | G | B | R | G | R | B | G | B | R | G |
| B | G | PA(G) | R | G | PB(G) | B | G | PA(G) | R | G | PB(G) | B |
| R | G | G | B | G | G | R | G | G | B | G | G | R |

Fig. 2

METHOD FOR PROCESSING IMAGE DATA OF AN IMAGE SENSOR BASED ON SYMMETRIC OR ASYMMETRIC POSITIONING OF PHASE DETECTION PIXEL, IMAGE PROCESSOR UNIT AND COMPUTER PROGRAM

FIELD OF THE INVENTION

The invention relates to a method for processing image data of an image sensor, said image sensor comprises a sensor area of a pixel matrix providing image pixel data, wherein the pixel matrix comprises phase detection pixels at pre-defined locations and wherein a set of image pixel data comprises phase detection information of said phase detection pixels.

The invention further relates to an image processor unit for processing image data of an image sensor and a computer program comprising instructions which, when executed by a processing unit, cause the processing unit to process image data of an image sensor according to the above mentioned method.

Said image sensor comprises a sensor area of a pixel matrix providing image pixel data. The pixel matrix comprises phase detection pixels at pre-defined locations, wherein said image sensor provides image pixel data at the input of the image processor unit and wherein a set of image pixel data comprises phase detection information of said phase detection pixels.

BACKGROUND OF THE INVENTION

Digital imagers are widely used in everyday products, such as smart phones, tablets, notebooks, cameras, cars and wearables. Many of the imaging systems in those products have the feature of automatic focusing (AF) in order to produce sharp images/videos. The traditional approach to automatic focusing is based on contrast detection. The lens is moved to the position where the scene contrast is the highest. Contrast automatic focusing is generally slow, and the technology of phase detection autofocus (PDAF) can then be coupled with it to improve the speed, and at times accuracy, of focusing.

PDAF sensors have the so-called phase detection (PD) pixels arranged across the whole sensor area. The phase information derived from the phase detection pixels can be used to determine the focal length, which in turn drives the lens to move to the position with the optimal focus, and that process is typically very fast if the phase information is accurate enough. The phase detection pixels are typically arranged periodically in the horizontal and vertical directions, across the entire sensor. After extracting the phase information from those pixels, they must be concealed or corrected. Otherwise, they could appear as a mesh of clustered defects across the image. It is, therefore, essential to have a phase detection pixel concealment (PPC) module in the image signal processor to maintain high image quality.

N. El-Yamany: "Robust Defect Pixel Detection and Correction for Bayer Imaging Systems," in: IS&T International Symposium on Electronic Imaging 2017, p. 46-51, discloses a method for identifying singlets and couplets of hot pixels, cold pixels or mixture of both types. Those pixels are not corrected early in the image processing pipeline, demosaicing and filtering operations will cause them to spread and appear as coloured clusters that are detrimental to image quality. The method operates on the raw data coming from the Bayer sensor. A defect pixel is identified if two conditions are met. In the first condition, it is checked whether the pixel is significantly different from its same-colour neighbours in the S×S Bayer window centered at that pixel. In the second condition, it is tested whether the local brightness difference at the pixel is significantly higher for hot pixels or lower for cold pixels than the smallest local brightness difference for each colour channel when the 3×3 Bayer window is centered at the pixel.

A detected defect pixel is replaced with the robust, detail-preserving estimate, which is determined by use of directional filters.

E. Chang: "Kernel-size selection for defect pixel identification and correction", in: Proc. SPIE 6502, Digital Photography III, 65020J, 20 Feb. 2007, describes a bounding min-max filter with varying kernel sizes for defect pixel correction.

S. Wang, S. Yao, O. Faurie, and Z. Shi: "Adaptive defect correction and noise suppression module in the CIS image processing system", in: Proc. SPIE Int. Symposium on Photoelectronic Detection and Imaging, vol. 7384, p. 73842V-1-6, describes a spatial adaptive noise suppression algorithm which combines a defect pixel correction function for implementation in a CMOS image sensor chip. A centre weighted median filter is provided to correct defect pixels. Random noises are treated separately according to the detail level of their background.

A. Tanbakuchi, A. van der Sijde, B. Dillen, A. Theuwissen and W. de Haan: "Adaptive pixel defect correction", in: Proc. SPIE Sensors and Camera Systems for Scientific, Industrial and Digital Photography Applications IV, vol. 5017, pp. 360-370, 2003, presents a defect correction algorithm utilizing raw Bayer image data. If a pixel in an image is found to be defective, the neighbouring pixels provide the best information for interpolating the defective pixel. Directional derivates are used to correlate the nearest points to the defect colour plane.

M. Schoberi, J. Seiler, B. Kasper, S. Foessel and A. Kaup: "Sparsity-based detect pixel compensation for arbitrary camera raw images", in: IEEE International Conference on Acoustics, Speech and Signal Processing, pp. 1257-1260, 2011, discloses an algorithm for detecting defect pixels and interpolating the missing values for the defect pixels. Previously interpolated pixels are re-used.

SUMMARY OF THE INVENTION

The present invention provides an improved method and image processor unit, which provides a robust scheme for phase pixel concealment in imaging sensors in a generic framework, maintains low computational complexity and does not require any tuning or control parameters.

It is proposed to carry out the step of calculating image pixel data for the pre-defined locations of the phase detection pixels as a function with either symmetric or asymmetric positioning of the respective phase detection in the colour channel.

This allows to correct defect pixels with low computational complexity and without requiring any tuning or control parameters.

In order to provide image data at the pre-defined locations of phase detection pixel to complete the image and to avoid artefacts at the pre-defined PD pixel locations, image pixel data is calculated for these locations. The image raw data of the image sensor is processed, wherein the missing image pixel data at the locations of phase detection pixels are determined in two different ways, depending on a symmetric or an asymmetric positioning of the respective phase detection pixels in the respective colour channel.

Phase detection pixels can be positioned in one or more colour channels in the colour filter array of an image sensor. For example, the phase detection pixels could be positioned in the B and W channels of an RGBW sensor, or in the B channel in a standard Bayer sensor.

When the phase detection pixel is positioned in a colour channel that exhibits symmetry, such as the W channel in the RGBW colour channel arrangement, or the R, G and B channels in the standard Bayer colour channel arrangement, the image pixel data for the pre-defined locations of the phase detection pixels are calculated in first procedures specified for symmetric colour channel arrangement.

In case that the arrangement of the colour channel is asymmetric, the image pixel data for the pre-defined positions of the phase detection pixels are calculated according to a second procedure.

Thus, it is decisive whether the phase detection pixels is positioned in a colour channel that exhibits symmetry or asymmetry.

This allows for a robust phase detection pixel concealment without the requirement of pre-calibration or pre-knowledge of the phase detection pixel behaviour. There is no tuning of parameters required and the computational complexity can be kept very low. Therefore, the method is suitable for real-time, resource-constrained image signal processing.

In case that the phase detection pixels are asymmetrically positioned in the colour channel, i.e. the colour channel exhibits asymmetry, the image pixel data can be preferable calculated as a function of the adjacent image pixel values of sensor pixels in the same colour according to the colour assigned to the position of the phase detection pixel.

Preferably, the image pixel data are calculated as average value of the closest adjacent image pixel values of the same colour pixels located around the position of the selected phase detection pixel. For example, when the phase detection pixel is positioned in a colour channel that does not exhibit symmetry, such as the R, G or B channels in the RGBW colour filter array pad or the R and G and B channels in the Quad Bayer colour filter array pattern, the phase pixel concealment relies solely on one step of the closest neighbours concealment. The image pixel data for the location of the phase detection pixel is calculated as a robust estimate determined from the closest neighbours of the location of the phase detection pixel. One possibility for such an estimate is for example the alpha-trimmed mean of the same colour pixels in the neighbourhood of the pixel being concealed. Another possibility is some weighted average of those same-colour neighbours.

In an approved method for calculating image pixel data for asymmetric positioned phase detection pixel, directional or content-aware concealment could give better image quality than non-directional correction. It is therefore preferred that, when interpolating closest neighbours, the interpolation strategy attempts as much as possible to identify directions or takes into account the content in the raw support at the pixel being corrected. An option is to weight the image pixel values of the closest neighbours of the same colour pixels.

For calculating the image pixel data for symmetrically positioned phase detection pixel in a respective colour channel, it is preferred to estimate image pixel data for phase detection pixels located in the pre-determined area around the respective selected phase detection pixel selected for calculating a related pixel image data, to identify the feature direction at the position of the selected phase detection pixel, and to calculate the image pixel data as the function of the interpolated pixel data located adjacent to the selected phase detection pixel in the identified feature direction.

Thus, for a colour channel exhibiting symmetry, a sequence of steps is processed for calculating the image pixel data for the locations of phase detection pixels. Specifically, when the phase detection pixel is positioned in a colour channel that exhibits symmetry, such as the W channel in the RGBW coloured filter array, or the R and G and B channels in the standard Bayer colour filter array, directional estimation and correction is facilitated for symmetry. First, a robust estimate is calculated for each of the phase detection pixel locations. Then, a directional filtering is performed based on the identified feature direction. The allowed determination of robust estimate for the phase detection pixel in the surrounding of the location of a phase detection pixel improves the quality of the directional filtering. The image pixel data for the phase detection pixel locations are then calculated as a directional or non-directional concealment.

Preferably, a respective image pixel value is calculated as a function of the pixel data located in the selected area adjacent to and around the selected phase detection pixel in case that no feature direction could be identified.

Otherwise, the pixel value of the location of the selected phase detection pixel is calculated by use of adjacent pixel values related to the same colour as a related colour channel assigned to the position of the selected phase detection pixel.

Preferably, in a first step, the symmetric or asymmetric arrangement of the phase detection pixels in a colour channel is determined as a function of a colour channel parameter.

The state of symmetric or asymmetric arrangement of the phase detection pixel may also be pre-said and therefore known so that no determination step is required.

The phase detection pixels can be positioned in the image sensor as a cluster of connected pixels. Regardless of specific arrangements of the colour filter array or the phase detection pixels, the input raw data can be processed in a first step to decompose the phase detection clusters of pixels into singlets of phase detection pixels per colour channel, into couplets in the case of big clusters. The phase detection clusters of pixels repeats periodically in the horizontal and vertical directions across the entire image sensor.

For example, it is preferred to decompose a cluster of phase detection pixels into singlets and/or couplets, in particular when the phase detection pixels repeat periodically in the horizontal and/or vertical direction of the image sensor area. By way of example, the can be executed by decomposing a couplet of replaced detection pixels in a colour channel (e.g. B channel) into a quadruplet in the same colour channel (e.g. B channel). The quadruplet can be be further decomposed into four singlets in the same colour channel. Two couplets, for example, can be decomposed into four singlets of the same colour channel. By way of the decomposition scheme, many other decompositions of clusters into singlets and/or couplets are conceivable. Each singlet phase detection pixel has its own neighbours and will be concealed independently of the other connected phase detection pixels.

BRIEF DESCRIPTION OF THE DRAWINGS

The invention is described by way of an example with the enclosed figures. It shows:

FIG. 1 Exemplary phase detection pixel positions in an RGBW colour filter array;

FIG. 2 Example of a CMOS RGBW sensor comprising phase detection pixels;

DETAILED DESCRIPTION OF THE INVENTION

Figure 3:
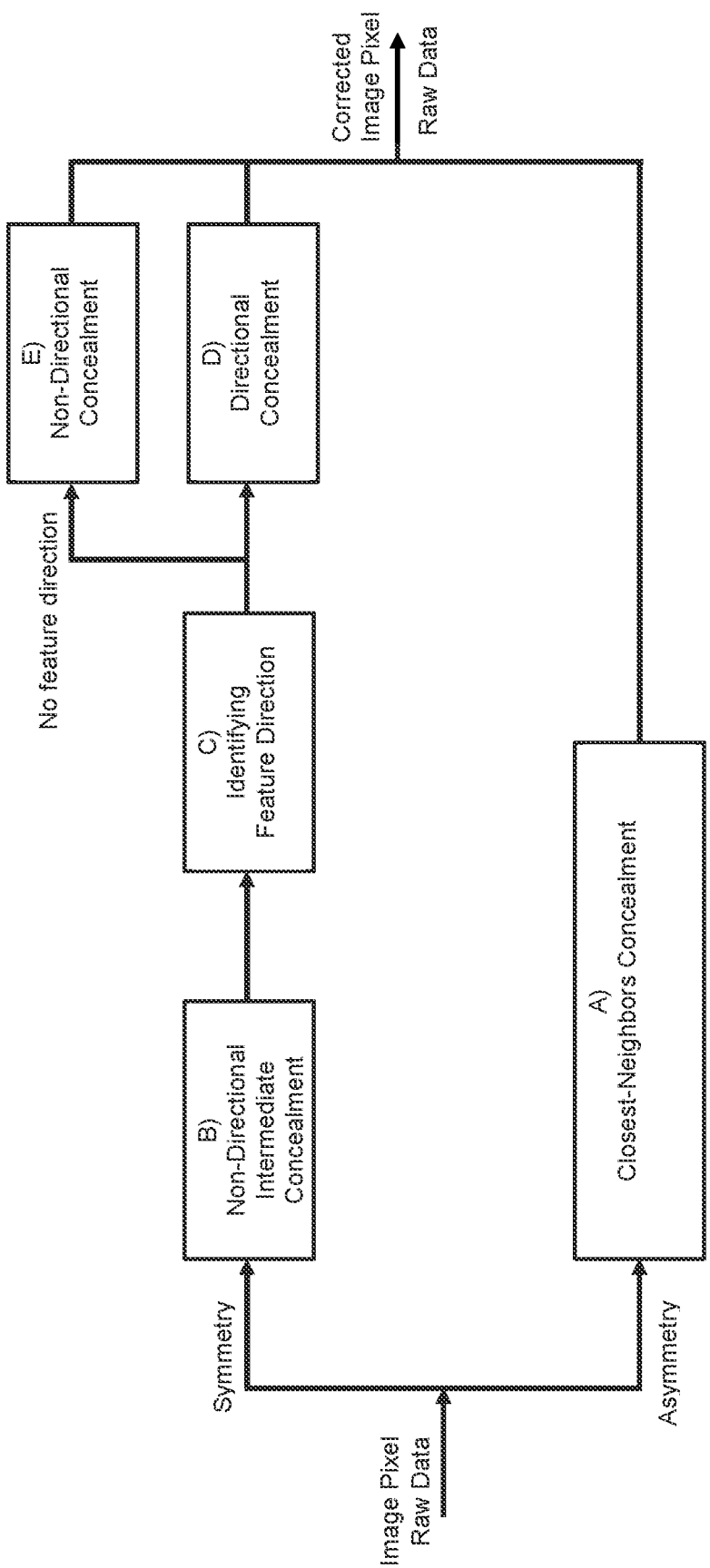
FIG. 3 Flow diagram of the method for processing image data of an image sensor.

FIG. 1 shows a part of an exemplary phase detection arrangement on an RGBW colour filter array data. The red R, green G, blue B and white W pixel and the pixel position in the 8×8 array are identified by the numbers and the letters in brackets identify the respective colour of the pixel. The complete pattern may consist of blue blocks each formed by a matrix of alternating blue and white pixels as indicated by the first 4×4 matrix in FIG. 1 at the top left side (1(B), 2(W), 3(B), 4(W); 9(W), 10(B), 11(W), 12(B); 17(B), 18(W), 19(B), 20(W); 25(W), 26(B), 27(W), 28(B)), of green blocks each formed by a matrix of alternating green and white pixels as indicated in the second 4×4 matrix at the top right side in FIG. 1, and of red blocks each formed by a 4×4 matrix of alternating red and white pixels as indicated in the second 4×4 matrix at the bottom right side in FIG. 1. A first line of the complete pattern may be formed by a sequence of alternating blue and green blocks, and adjacent second line may be formed by a sequence of alternating green and red blocks. Such groups of first and second line are then repeated to form all lines of the pattern, e.g. the height, wherein the width of the pattern is determined by the length of the lines.

The phase detection pixels are identified by thick frames.

At the position of the phase detection pixels, the respective assigned colour image pixel values are missing. This has the effect of visible defect in the image, in particular after processing the raw sensor data.

The phase detection pixels placed in a respective colour channel forms a couplet. For example, the four phase detection pixels in the blue channel 1(B), 10(B), 19(B) and 28(B) forms a quadruplet, while the first pair of phase detection pixels in the white channel 2(W) and 9(W) forms a first couplet and the second pair of phase detection pixels in the white channel 20(W) and 27(W) forms a second couplet in the white channel. The problem then reduces to the concealment of the quadruplet in the blue channel and the two couplets in the white channel. The four phase detection pixels (quadruplet) in the blue channel are corrected independently from the other four phase detection pixels (two couplets) in the white channel.

FIG. 2 presents an example of a CMOS sensor comprising green G, red R and blue B pixel and pairs of phase detection pixels PA, PB. The image sensor includes colour sensors on pixels arranged in horizontal and vertical direction where all colours are arranged in each line in the directions, as described in the U.S. Pat. No. 8,531,563 B2.

The phase detection pixels are arranged in the green image pixel positions of a repeating 6×6 grid used in this exemplary image sensor.

In order to conceal the image data for the related colour at the position of a phase detection pixel, the method differentiates between phase detection pixels position in the colour channel that exhibits symmetry and one that exhibits asymmetry.

However, phase detection pixels can be positioned in one or more colour channels in the colour filter array. For example, the phase detection pixels could be positioned in the B and W channels of an RGBW sensor as shown in FIG. 1, or the B channel in the standard Bayer sensor.

In addition, the phase detection pixels can also be positioned as a cluster of connected pixels as shown in FIG. 1 and FIG. 2.

Regardless of the colour filter array and the specific arrangement of the phase detection pixels, it is preferred to decompose clusters of phase detection pixels, which repeat periodically in the horizontal and vertical directions across the entire image sensor, into singlets of phase detection pixels per colour channel or into couplets in the case of big clusters.

For example, the phase detection pixels of the phase detection pixel arrangement shown in FIG. 1 could be decomposed into A) A quadruplet in the B channel, which can be further decomposed into four singlets in the B channel; or B) Two couplets in the W channel, which can be further decomposed into four singlets in the W channel.

Each singlet phase detection pixel has its own neighbours and will be concealed independent of the other connected phase detection pixels.

FIG. 3 shows a method of processing image data of an image sensor, which comprises a sensor area of a pixel matrix providing image pixel data, as exemplarily shown in FIG. 1 and FIG. 2.

The method differentiates between the phase detection pixels being positioned in a colour channel that exhibits symmetry and that does not exhibit symmetry, i.e. an asymmetry colour channel.

The image pixel raw data are processed in the step A) by the method of closest-neighbours concealment, when the phase detection pixel is positioned in the colour channel that does not exhibit symmetry. This is the case for example for the R, G or B channels in the RGBW colour filter array pattern, or the R and G and B channels and the Quad Bayer colour filter array pattern.

In step A), a robust estimate is used to conceal the phase detection pixel. One possibility for such an estimate is for example calculating the alpha-trimmed mean of the same-colour pixels in the neighbourhood of the pixel being concealed. Another possibility is some weighted average of those image pixels directly neighbouring the phase detection pixel with the same colour assigned to the position of the phase detection pixel in the colour filter array.

For example, to conceal the phase detection pixel PA(G) in the green colour channel at the position in line 2, column 3 in FIG. 2, the image value for the displayed phase detection pixel is calculated by interpolating the four directly neighbouring image pixel values of the green pixels at the position in line 1, column 4, line 2, column 2, line 3, column 2 and 3.

The image quality can be improved by weighting the neighbouring image pixels of the same colour according to the content or direction. This direction or content-aware concealment interpolates the closest neighbours using a strategy which attempts, as much as possible, to identify directions, or takes into account the content of the raw support of the pixel being corrected.

The method decides depending on the colour channel arrangement in the colour filter array, which path is selected either in step A) or in the sequence of step B), C) and D) or E).

When the phase detection pixel is positioned in the colour channel that exhibits symmetry, the upper path starting with step D) of non-directional intermediate concealment is selected. This is the case for example for phase detection pixels located in the W channel in the RGBW colour filter array, or the R and G and B channels in the standard Bayer colour filter array. The symmetry facilitates directional estimation in correction.

In step B), a non-directional pre-concealment is performed. A robust estimate (pre-concealment) is calculated for each of the phase detection pixels. All other non-phase detection pixels are kept intact.

The purpose of this pre-concealment, i.e. the pre-processing in step B), is to provide an intermediate clean estimate of the raw support around the phase detection pixel being concealed. This in turn facilitates robust direction identification at that phase detection pixel position without disturbance by the presence of other phase detection pixels in the raw support.

Let P_pd_est (x, y) denote a robust estimate of the PD pixel of the position (x, y), where x and y are the pixel coordinates of the sensor. The raw support can be defined as an N×N window centered at the pixel P (x, y) for example with N=3 or 5. P_pd_est (x, y) must be robust to the presence of other same-colour phase pixels in the raw window centered at P (x, y). Any robust estimate can be used, such as the alpha-trimmed mean (e.g. using the weighting factor alpha=2) of the weighted image pixel values of the same colour around the PD pixel at the position (x, y). The estimate may exclude other phase detection pixels in the raw window if necessary.

In the following step C), a directional filtering is performed for identifying the feature direction. In this step, the purpose is to identify the feature direction at the position of the phase detection pixel P (x, y) being concealed. Therefore, directional filtering is performed on the pre-concealment result. Specifically, at the phase detection pixel position, the pixel along with its same-colour neighbours are convolved with a set of directional filters. Based on the maximum absolute response of the filter set, the feature direction is identified at the phase detection position.

The number, size and coefficients of the filters depend on several factors selected from
 a) The number of directions planned to be identified and supported in the concealment scheme;
 b) The size of the raw support centered at the phase detection pixel;
 c) The colour filter array channel arrangements; and
 d) The type of the filters (gradient-based or otherwise).

In case that a feature direction at the respective phase detection pixel position P(x, y) is identified, the phase detection pixel P(x, y) is concealed in step D) by directional concealment with interpolating the image pixel assigned to the colour along the identified direction. In order to reduce or eliminate the possibility of correction artefacts, the directional correction is typically limited to a small neighbourhood of the pixel. This can be limited for example to an N×N window centered at the phase detection pixel P (x, y) to be concealed for example with N=3 or 5.

In case that no feature direction is identified, e.g. in very smooth regions, the step E) of non-directional concealment is performed instead of step D) by replacing the phase detection pixel P (x, y) with a robust estimate of it, e.g. by P_pd_est (x, y).

When concealing the phase detection pixel P(x, y) via directional interpolation in step D), if one or more phase detection pixels exist along the identified direction, then its robust estimate P_pd_est (x, y) calculated in the pre-concealment step B) should be used in order to guarantee robust concealment results and to achieve a better image quality.

The disclosed method does not need to know the value of the phase detection pixel. Only its position is required. Also, there is no need for assumption on the phase detection pixel behaviour. Thus, the method is applicable to phase detection pixel concealment regardless of the type of colour filer placed in front of the phase detection pixel and regardless of the precision in the colour channel of the colour channel array.

The corrected image pixel raw data are then further processed.

What is claimed is:

1. A method for processing image data of an image sensor, said image sensor comprises a sensor area of a pixel matrix providing image pixel data, wherein the pixel matrix comprises phase detection pixels at pre-defined locations, and wherein a set of image pixel data comprises phase detection information of said phase detection pixels, the method comprising: selecting either a procedure A) of calculating image pixel data for the pre-defined locations of the phase detection pixels specified for symmetric colour channel arrangement in case that the respective phase detection pixels are positioned in a colour channel that exhibits symmetry in the respective colour channel in the respective colour channel or a procedure B) of calculating image pixel data for the pre-defined locations of the phase detection pixels specified for asymmetric colour channel arrangement in case that the respective phase detection pixels are positioned in a colour channel that exhibits asymmetry in the respective phase detection pixels.

2. The method according to claim 1, comprising calculating the image pixel data for assymetric positioned phase detection pixel in the colour channel as a function of the adjacent image pixel values of sensor pixels of the same colour according to the colour assigned to the position of the phase detection pixel.

3. The method according to claim 2, comprising calculating the image pixel data as average value of the closest adjacent image pixel values of the same colour pixels located around the position of the selected phase detection pixel.

4. The method according to claim 1, wherein
 a) Calculating the image pixel data for symmetric positioned phase detection pixel in a colour channel by:
 b) Estimating image pixel data for phase detection pixels located in a pre-determined area around the respective selected phase detection pixel selected for calculating related pixel image data in step a),
 c) Identifying the feature direction at the position of the selected phase detection pixel and
 d) Calculating the image pixel value as a function of the interpolated pixel data located adjacent to the selected phase detection pixel in the identified feature direction.

5. The method according to claim 4, comprising calculating a respective image pixel value as a function of the pixel data located in the selected area adjacent to and around the selected phase detection pixel in case that no feature direction could be identified in step c).

6. The method according to claim 1, comprising calculating the pixel value for the location of a selected phase detection pixel by use of adjacent pixel values related to the same colour as the related colour channel assigned to the position of the selected phase detection pixel.

7. The method according to claim 1, comprising a first step of determining symmetric or asymmetric arrangement of the phase detection pixels in a colour channel as a function of a colour channel parameter.

8. The method according to claim 1, comprising presetting the state of symmetric or asymmetric arrangement of the phase detection pixels.

9. A non-transitory computer-readable medium comprising computer-executable instructions which, when the computer-executable instructions are executed by a processing unit, cause the processing unit to carry out the steps of the method of claim 1.

10. An image processor unit for processing image data of an image sensor, said image sensor comprises a sensor area of a pixel matrix providing image pixel data, wherein the pixel matrix comprises phase detection pixels at pre-defined locations, wherein said image sensor providing image pixel data at the input of the image processor unit and wherein a set of image pixel data comprises phase detection information of said phase detection pixels, wherein the image processor unit is configured to: select either a procedure A) of calculating image pixel data for the pre-defined locations of the phase detection pixels specified for symmetric colour channel arrangement in case that the respective phase detection pixels are positioned in a colour channel that exhibits symmetry in the respective colour channel in the respective colour channel or a procedure B) of calculating image pixel data for the pre-defined locations of the phase detection pixels specified for asymmetric colour channel arrangement in case that the respective phase detection pixels are positioned in a colour channel that exhibits asymmetry in the respective phase detection pixels.

11. The image processor unit according to claim 10, wherein the image processor unit is configured to calculate the image pixel data for an assymetric positioned phase detection pixel in the colour channel as a function of the adjacent image pixel values of sensor pixels of the same colour according to the colour assigned to the position of the phase detection pixel.

12. The image processor unit according to claim 11, wherein the image processor unit is configured to calculate the image pixel data as average value of the closest adjacent image pixel values of the same colour pixels located around the position of the selected phase detection pixel.

13. The image processor unit according to claim 10, wherein the image processor unit is configured to
a) Calculate the image pixel data for symmetric positioned phase detection pixel in a colour channel by:
b) Estimate image pixel data for phase detection pixels located in a pre-determined area around the respective selected phase detection pixel selected for calculating related pixel image data in step a),
c) Identify the feature direction at the position of the selected phase detection pixel and
d) Calculate the image pixel value as a function of the interpolated pixel data located adjacent to the selected phase detection pixel in the identified feature direction.

14. The image processor unit according to claim 13, wherein the image processor unit is configured to calculate a respective image pixel value as a function of the pixel data located in the selected area adjacent to and around the selected phase detection pixel in case that no feature direction could be identified in step c).

15. The image processor unit according to claim 10, wherein the image processor unit is configured to calculate the pixel value for the location of a selected phase detection pixel by use of adjacent pixel values related to the same colour as the related colour channel assigned to the position of the selected phase detection pixel.

16. The image processor unit according to claim 10, wherein the image processor unit is configured to determine a symmetric or asymmetric arrangement of the phase detection pixels in a colour channel as a function of a colour channel parameter.

17. The image processor unit according to claim 10, wherein the image processor unit is configured to pre-set the state of symmetric or asymmetric arrangement of the phase detection pixels.

* * * * *